Sept. 13, 1955          G. E. HAGEN          2,717,987

ELECTRONIC ANGLE MEASUREMENT

Filed Oct. 3, 1949          4 Sheets-Sheet 1

INVENTOR:
GLENN E. HAGEN

Sept. 13, 1955          G. E. HAGEN          2,717,987

ELECTRONIC ANGLE MEASUREMENT

Filed Oct. 3, 1949                                    4 Sheets-Sheet 2

INVENTOR:
GLENN E. HAGEN

BY Herbert E. Metcalf
ATTORNEY

Sept. 13, 1955 G. E. HAGEN 2,717,987
ELECTRONIC ANGLE MEASUREMENT
Filed Oct. 3, 1949 4 Sheets-Sheet 3

Fig. 4

INVENTOR:
GLENN E. HAGEN

BY Herbert E. Metcalf
ATTORNEY

Sept. 13, 1955 G. E. HAGEN 2,717,987
ELECTRONIC ANGLE MEASUREMENT
Filed Oct. 3, 1949 4 Sheets-Sheet 4

INVENTOR:
GLENN E. HAGEN
BY Herbert E. Metcalf
ATTORNEY

United States Patent Office 2,717,987
Patented Sept. 13, 1955

2,717,987

ELECTRONIC ANGLE MEASUREMENT

Glenn E. Hagen, Lawndale, Calif., assignor to Northrop Aircraft, Inc., Hawthorne, Calif., a corporation of California Application October 3, 1949, Serial No. 119,357

14 Claims. (Cl. 340—207)

My invention relates to the accurate measurement of angles, and more particularly to the measurement of angles by harmonic interpolation.

In certain devices, such as, for example, automatic celestial navigation systems, it is desirable to measure angles, such as start altitudes with as high an accuracy as possible. It is also desirable to have the angle expressed as a number, in order that it can be compared with another number representing a desired angle at some given time instant.

It is an object of the present invention to provide a means and method of measuring an angle in terms of a number of large value.

It is a still further object of the present invention to provide a means and method of measuring the change in angular position of a rotating element in terms of a number of large value.

Briefly, the invention includes the continuous rotation of an initiating signal element and the translation of an angular movement of a cooperating member into alternating electrical energy of relatively low frequency, accurately multiplying the low frequency to obtain higher harmonics thereof, comparing these harmonics with a known high frequency to obtain a difference frequency, and counting the difference frequency to obtain a number representing the angular movement of the rotating member. The counter is preferably connected to add or subtract so that the number in the counter will at all times represent the angular position of the rotating member.

The invention will be more fully understood by reference to the following description of the appended drawings, in which.

Figures 1, 2:
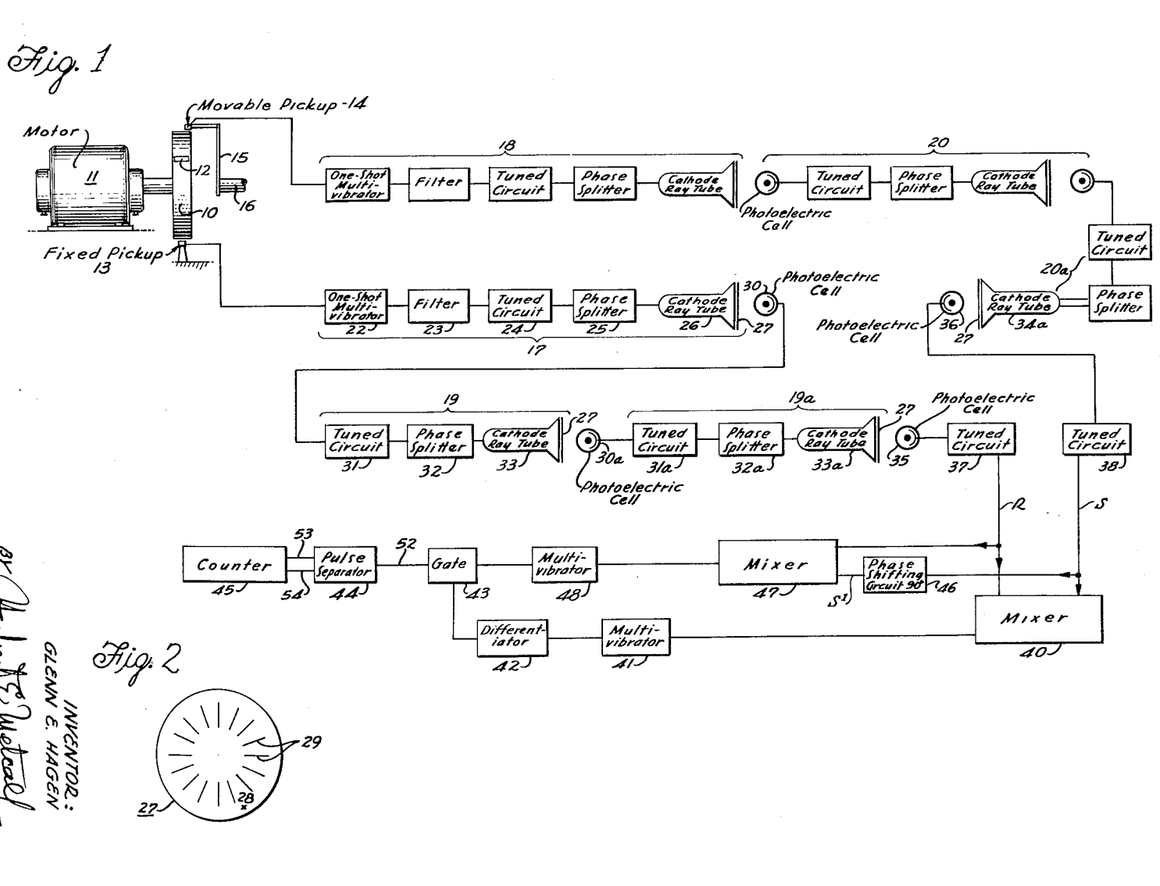
Figure 1 is a schematic diagram of a circuit embodying one preferred form of the present invention.
Figure 2 is a diagrammatic plan view of a cathode ray screen mask used in the circuit of Figure 1.

Referring first to Figure 1, a disc 10 is rotated, preferably at constant speed by motor 11. Disc 10 carries a signal initiating segment 12 such as, for example, a small permanent magnet near the periphery of disc 10. A fixed pickup 13 is positioned, so that a signal pulse is picked up thereby when segment 12 is rotated past the fixed pickup 13. Similarly, adjacent the periphery of disc 10 is a movable pickup 14 rotatable around the periphery of disc 10 by means of a shaft arm 15, attached to a shaft 16 positioned coaxial with the axis of rotation of disc 10. It is the angular movement of shaft 16 that it is desired to measure accurately. Movable pickup 14 is similar to the fixed pickup 13, and a signal pulse will also be generated in the movable pickup 14 when the signal initiation segment 12 passes it.

The frequency of the signal pulses in both pickups is then multiplied. This frequency multiplication may be accomplished in any desired manner, but I prefer to use cathode-ray tube, photocell multipliers; as, in "this" way spurious harmonics can be substantially prevented from passing through the frequency multiplication circuit.

As shown in Figure 1 each pickup 13 and 14 is connected to an initial cathode ray tube train 17 and 18 respectively, and to two following cathode ray trains 19, 19a, and 20, 20a, respectively. As each initial train is alike and as all of the following trains are alike only trains 17 and 19 connected to the fixed pickup 13 will be described in full.

Initial cathode ray train 17 comprises a one-shot multivibrator 22 fed by fixed pickup 13.

Multivibrator 22 feeds into a filter 23 which in turn energizes a tuned circuit 24.

Tuned circuit 24 is connected to a phase splitter 25 which energizes the deflecting plates or deflecting coils (not shown) of a cathode-ray tube 26. The phase splitter 25 provides two signals spaced 90°, so that the spot in the cathode-ray tube 26 describes a circular path.

Cathode-ray tube 26 is provided with a mask 27 made as shown diagrammatically in Figure 2, this mask 27 having an opaque portion 28 with a plurality of radial windows 29 therein intersecting the circular path of the cathode ray spot, so that a plurality of light pulses are formed outside of the cathode ray tube 26. The number of pulses thus generated for one circular sweep of the spot corresponds to the number of windows 29.

The first following train 19 consists of a photoelectric cell 30, placed to receive light pulses from the preceding cathode-ray tube 26. This photocell 30 feeds a second tuned circuit 31, a second phase splitter 32, and a second cathode-ray tube 33 provided with a mask 27 similar to that associated with cathode-ray tube 26. The second following train, 19a, consists of the same combination of photocell 30a, tuned circuit 31a, phase splitter 32a, and a final cathode-ray tube 33a.

As the movable pickup 14 is provided with identical trains, the frequency in final cathode-ray tubes 33a and 34a of the fixed pickup train, and the movable pickup train respectively, will be the same for the same input from disc 10.

A terminal photocell 35 is placed in front of the mask 27 of the cathode-ray tube 33a and a second terminal photocell 36 is placed in front of the mask 27 of the cathode-ray tube 34a. Terminal photocells 35 and 36, respectively, feed terminal tuned circuits 37 and 38, and these latter tuned circuits then transfer energy to a mixer 40. The output of mixer 40 drives a multivibrator 41. The essentially square wave output from multivibrator 41 is differentiated in differentiating circuit 42 and the positive and negative pulses so formed are either fed through or stopped at a gate 43. The output of gate 43 feeds a counter 45 after first passing through a pulse separator 44.

In addition, the output of terminal tuned circuit 38 leads through a terminal phase shifting circuit 46 to a second mixer 47, this latter mixer 47 also being fed directly from the output of terminal tuned circuit 37.

The output of second mixer 47 leads to a second multivibrator 48 which is connected to open and close the gate 43.

Figure 3:
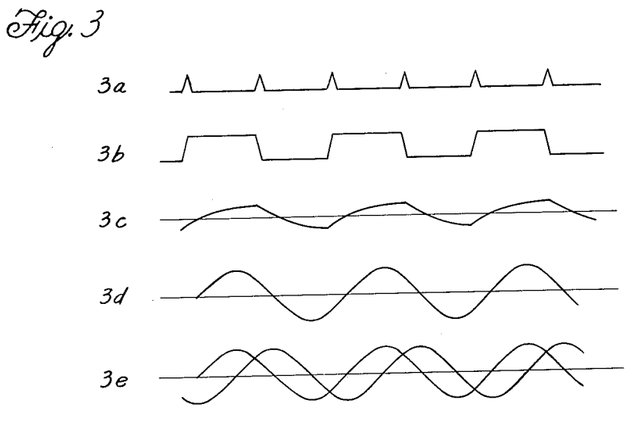
Figure 3 is a series of graphs showing wave forms in the pickup and frequency multiplying circuit of Figure 1.

The output from the pickup devices 13 and 14 will generally constitute a series of electric pulses, as shown in graph 3a of Figure 3. Following through the initial cathode-ray tube train 17, the pulses from the fixed pickup device 13, after being applied to one-shot multivibrator 22, result in an output from this multivibrator 22 as shown in graph 3b. After passing through filter 23, the wave form is substantially as shown in graph 3c. The output of tuned circuit 24 is a sinusoidal wave as shown in graph 3d. After passing through phase splitter 25 the signal consists of two sinusoidal waves displaced 90° as shown in graph 3e. These latter waves when applied to cathode-ray tube 26 cause a circular path to be taken by the beam spot on the screen thereof, this path intersecting the windows 29 on the mask 27.

Thus a series of pulses roughly similar to those shown in graph 3c are produced in the output of the photocell 30. These pulses which are substantially sine waves are fed to second tuned circuit 31 through second phase splitter 32 to the second cathode ray tube 33.

A modification of the cathode ray tube frequency multiplying train here disclosed is to make the mask 27 of a non-conducting material and to position it in front of a conducting plate. This mask and plate is used to replace the screen of the conventional cathode-ray tube. Thus electrons in the electron beam now intermittently pass through the mask and hit the conducting plate. The tuned circuit of the train is connected, as before, to pick up the plurality of signals thus generated.

Figures 4, 9:
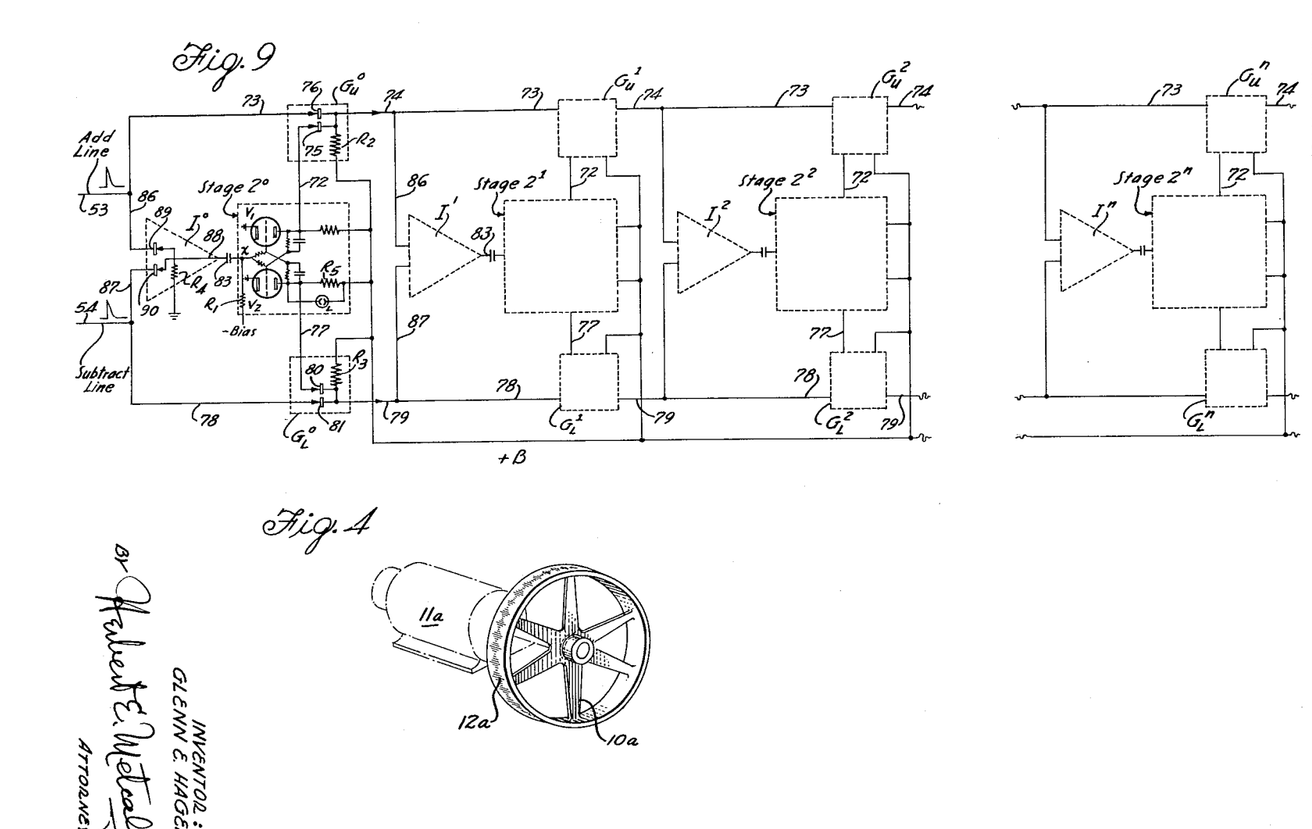
Figure 4 is a schematic illustration of a modification of the disc of Figure 1 showing a means for obtaining a plurality of initiating signals.
Figure 9 is a diagram, partly schematic, showing in full circuit diagram the first stage of the two-way binary counter and indicating the other stages for recording the change in the angle.

The amount of frequency doubling thus acquired will depend upon the number of cathode-ray tubes used and the number of windows utilized in the various cathode-ray tube masks 27. If desired, a plurality of signal initiating segments 12 can be used on disc 10 as shown in Figure 4, to obtain a higher final frequency. It can be seen in Figure 4 that an endless magnetic wave track 12a has been recorded on the periphery of a disc 10a in a manner as shown, described, and claimed in the F. G. Steele application filed April 1, 1952, Serial No. 280,061.

Although a slight inaccuracy may be present in this latter method, due to the inherent mechanical error in spacing a plurality of initiating segments on the disc, it should be noted that these errors average out in the present method of angle measurement and are of no serious consequence. Thus, the result is dependent upon the final frequencies to be compared and this is set to comply with the degree of accuracy required.

In this particular embodiment, pickoff signals for both frequency doubling channels are preferably obtained from the same disc as this eliminates the requirement for absolutely constant speed of the disc driving motor 4, inasmuch as variations in speed introduce the resultant frequency change into both channels.

A circular endless closed periodic wave track such as a sine wave, for example, recorded on disc 10a would produce a suitable wave signal from each pickup which can be provided directly to frequency multiplying means. In this instance, pickup 13 would be connected directly to the phase splitter of train 17 and pickup 14 would be connected directly to the phase splitter of train 18, for example. The remainder of the circuitry is unchanged.

The operation of the device after the signals from the two channels have reached the final photocells 35 and 36 is best described by reference to the wave forms shown in Figure 5.

The wave form in graph 5a is the wave form of the voltage at point R, i. e., the output of tuned circuit 37 controlled as to frequency by fixed pickup 13. As the disc 10 is rotated at uniform speed, this frequency will not change and will be referred to hereinafter as the reference frequency. The solid curve of graph 5b of Figure 5 illustrates the wave form originated by the movable pickup 14 at point S prior to entering phase shifting circuit 46, and the dashed curve illustrates the wave form at point S' after passing through the phase shifting circuit 46. It should be noted here that the movable pickup is assumed to be stationary for the configuration of the waves in graphs 5a and 5b. As indicated by the curves of graph 5b, the solid wave originated by the movable pickup 14 has been shifted as shown by the dashed wave to have a 90° phase lag by phase shifter 46. It is to be noted that phase shifter 46 differs from the phase splitters heretofore utilized to energize the cathode-ray tubes in that the output of phase shifter 46 is only a single wave, shifted 90° from its input wave.

The dashed wave of graph 5b which has been shifted 90° is then fed into mixer 47 to be mixed with the fixed frequency, from the fixed pickup 13, shown in curve 5a. At the same time the unshifted wave form (solid curve 5b) coming from tuned circuit 38 is fed to mixer 40 there to be mixed with the fixed reference frequency of curve 5a coming from tuned circuit 37.

Thus the outputs of mixers 40 and 47, which represent beat-frequencies, differ by reason of the fact that mixer 40 compares the frequencies directly as initiated by the fixed and movable pickups 13 and 14, whereas mixer 47 compares the frequency derived from fixed pickup 13 with the frequency derived from the movable pickup 14 shifted 90°. As both mixers 40 and 47 are provided with low pass filters, only the difference beat-frequencies will appear in their outputs.

When movable pickup 14 is moved due to rotation of shaft 16, the frequency at point S will vary as the angle of shaft 16 varies. This variation in frequency causes an output in mixers 40 and 47. These outputs can be visualized by assuming that the reference wave form of graph 5a is superimposed on each of the wave forms of graph 5b and then moved either to the right or left depending on the direction the angle of the shaft 16 is changing.

Comparing the relation of the reference wave form of graph 5a with that of the solid wave form of graph 5b, i. e., the comparison that exists at the input to mixer 40, it will be seen that initially the voltage wave form of graph 5a initiated by the fixed pickup 13 is in phase with the solid voltage wave 5b initiated by the movable pickup 13 and presented directly to the input of mixer 40. Thus, initially the output voltage from mixer 40 is at a maximum. As the voltage wave form of graph 5a is moved, for example, to the right along solid voltage wave form 5b, the wave forms move out of phase and the output voltage of mixer 40 decreases. Thus the output represents the difference frequency of the two waves as indicated by the trace 50 of graph 5c.

The voltage reference wave form of graph 5a and the dashed wave in graph 5b at the input of mixer 47, on the other hand, will be somewhat out of phase initially, in fact 90° for the present example, but tend to move in phase as the wave form of graph 5a is moved to the right along the dashed wave form of graph 5b. Thus the output from mixer 47 is initially close to zero and tends to increase to a maximum when the wave form of graph 5a and the dashed wave of graph 5b are in phase as indicated by the trace 51 of the graph 5c of Figure 5. The 50 and 51 traces of the graph 5c are the output waves from mixer stages 40 and 47 to be applied to multivibrators 41 and 48, respectively. The trace 50 leads the trace 51 by 90° for the present case.

When trace 50 crosses the zero point from minus to plus it actuates multivibrator 41 and differentiator 42 to cause a single positive pulse to be transmitted to gate 43. When trace 50 crosses the zero point from plus to minus, it actuates multivibrator 41 and differentiator 42 to cause a single negative pulse to be transmitted to gate 43. Thus an output graph of multivibrator 41, as shown in the graph 5e, can be drawn directly from the trace 50 of the graph 5c.

When the trace 51 of the graph 5c crosses the zero point from minus to plus it actuates second multivibrator 48 to cause gate 43 to change from a closed to an open condition. When the trace 51 crosses the zero point from plus to minus it actuates the second multivibrator 48 to cause gate 43 to change from an open to a closed condition. Thus a graph of the condition of the gate 43, as illustrated in the graph 5d, can be determined by inspection of the trace 51 in graph 5c.

The above describes the wave forms out of the mixers and the voltages at the gate 43 when shaft 16 makes a negative angular change. This description was facilitated by considering that the reference voltage wave form of graph 5a initiated by the fixed pickup 13 was superimposed and moved to the right along each of the wave forms of graph 5b initiated by the moveable pickup 14.

If now it is assumed that the shaft 16 makes a positive angular change, the resulting output from the mixers can best be described by considering that the reference wave form shown in graph 5a is superimposed and moved to the left along each of the wave forms of graph 5b.

On initial comparison of the reference wave form of the graph of 5a with the solid wave forms of graph 5b, it will be seen again that initially both the wave forms are at a maximum and in phase. Thus trace 50, which represents the difference frequency obtained by beating these wave forms, is again initially a maximum and is shown as such in graph 5f. As the reference wave form of graph 5a is now moved to the left along the solid voltage wave form 5b, the wave forms move out of phase and the output of mixer 40 decreases. Thus no change is noted for the trace 50 in graph 5f with the trace 50 in graph 5c.

Figure 5:
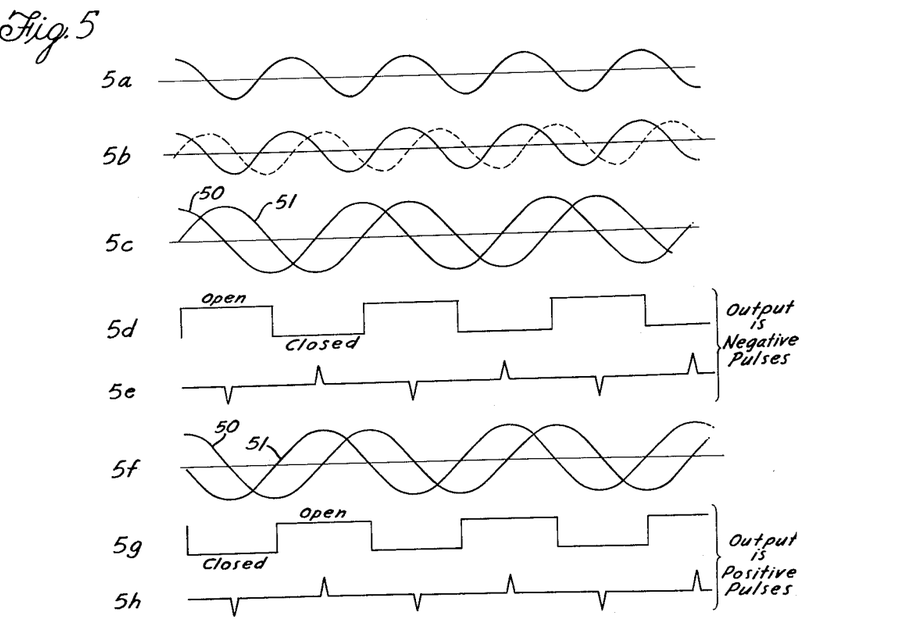
Figure 5 is a series of graphs showing the wave forms in the mixed circuits and the circuits for indicating positive and negative changes in the angle.

By referring to Figure 5 it can be seen that the voltage wave form of graph 5a and the dashed wave in graph 5b, which are to be compared in mixer 47, are out of phase initially for this case as before; but, whereas before these waves tended to move in phase toward a maximum, in the present case, when the wave form of graph 5a is superimposed and is moved to the left along the dashed wave form of graph 5b, the waves tend to move further out of phase and toward a minimum as indicated by the trace 51 of graph 5f. Thus it is noted in graph 5f that the trace 50 now lags by 90° the trace 51 which is indicative of a positive angular change of shaft 16.

As before, graphs 5g and 5h represent the condition of the gate 43 and the timing of the positive and negative polarity pulses to the gate. These latter graphs were obtained, as previously, by noting when and in which direction the traces 50 and 51 of graph 5f cross the zero voltage line.

Figure 6:
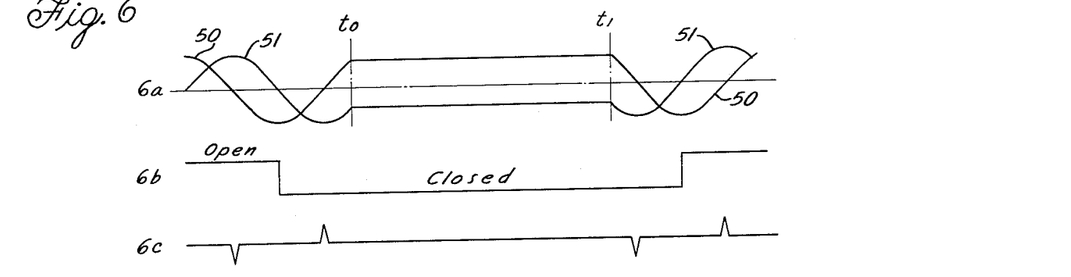
Figure 6 illustrates graphically the action of the device of the present invention as the angle to be measured decreases, remains constant momentarily, and then increases.

In order to further clarify and substantiate the accuracy of the harmonic interpolation of angular measurement in accordance with this invention, a graph of each of the output wave forms from the mixers is shown in Figure 6 when the moveable pickup 14 decreases its angle, remains constant momentarily, and then increases. As noted in graph 6a, for this example, the trace 50 leads the trace 51. By referring back to graph 5d in Figure 5, it was there substantiated that this was the condition existing at the output of the mixers for a decreasing angle, which is the condition desired.

At time $t_0$, on graph 6a, the moveable pickup 14 is assumed to stop. For this condition the output of mixers 40 and 47 remains fixed, i. e., no difference frequency is emitted. At a later time $t_1$ the moveable pickup starts increasing its angle, and, as noted here, the phase relation of traces 50 and 51 has now reversed. The trace 50 now lags the trace 51. This condition was previously established in graph 5f as existing at the output of the mixers for an increasing angle. Thus, it is clearly brought out by referring to graphs 6b and 6c, that a change in direction of the angular movement of shaft 16 or moveable pickup 14 results in opposite polarity pulses being passed through gate 43. Positive polarity pulses pass through gate 43 for increasing angle changes, and negative polarity pulses for decreasing angle changes.

Figure 7:
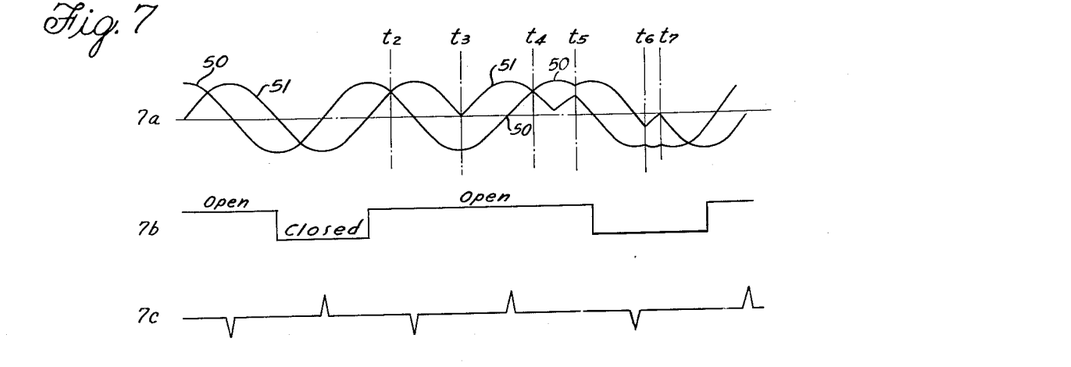
Figure 7 illustrates graphically the action of the device of the present invention when the angle to be measured goes through a series of increasing and decreasing periods.

In Figure 7, the action of the angle measuring device is described for instant reversals of the angular movement of the movable pickup 14; and for operating conditions such as "hunting" or vibrations that might possibly occur in the measuring system. It being understood that the present invention is especially adapted for measuring angles to a very high accuracy and, as being shown, without incurring any spurious results.

The angle of the movable pickup is initially decreasing for the present example as shown in graph 7a of Figure 7 by the 90° leading of sinusoidal trace 50 over sinusoidal trace 51. At the time $t_3$, the movable pickup 14 instantly reverses its angular direction, this occurs just before trace 51 can cross the zero voltage line from plus to minus to trigger multivibrator 48 to close gate 43. The movable pickup 14 then increases its angle for a distance corresponding to the instant $t_4$. At the instant $t_4$ the movable pickup 14 has moved an arcuate distance equivalent to cancelling any decrease in angle it made since time $t_2$, therefore, the counter 45 should have had no change for this combined decreasing and increasing angular movement. As noted in the graphs 7b and 7c, the gate 43 permitted both a positive and negative pulse to pass therethrough between the times $t_2$ and $t_4$ thus resulting in no change in angle recording in counter 45. The additional changes in angular rotation of the moveable pickup 14 at times $t_5$, $t_6$, and $t_7$ illustrate how the angle measurement is precisely held to within the interpolated accuracy obtained by the frequency multiplication.

It should be noted that the present device interpolates by dividing a 360° angular change of the moveable pickup 14 or shaft 16 into the number of divisions represented by the numerical value of the frequency multiplication as obtained, for example, in the embodiment of Figure 1.

Thus, referring back to Figure 5, when graphs 5d and 5e, which are characteristic for subtracting, or graphs 5g and 5h which are characteristic for adding, are superimposed the number and polarity of the pulses passed by the gate 43 is readily available; and hence a measure of the increase or decrease of the size of the angle or arc between the moveable and fixed pickup devices 14 and 13 is determined.

To automatically accomplish a visual indication of this measurement, the positive and negative pulses on common line 52, as shown in Figure 1, are fed into a pulse separator 44. Pulse separator 44 schematically represents a circuit which receives the positive and negative polarity pulses as such and feeds them out as positive polarity pulses on separate leads. The positive pulses being fed into the add line 53, and the negative pulses reversed in polarity and fed as positive pulses on the subtract line 54 of the binary counter 45. Counter 45 counts up or down in accordance with these pulses as is later to be described.

Figure 8:
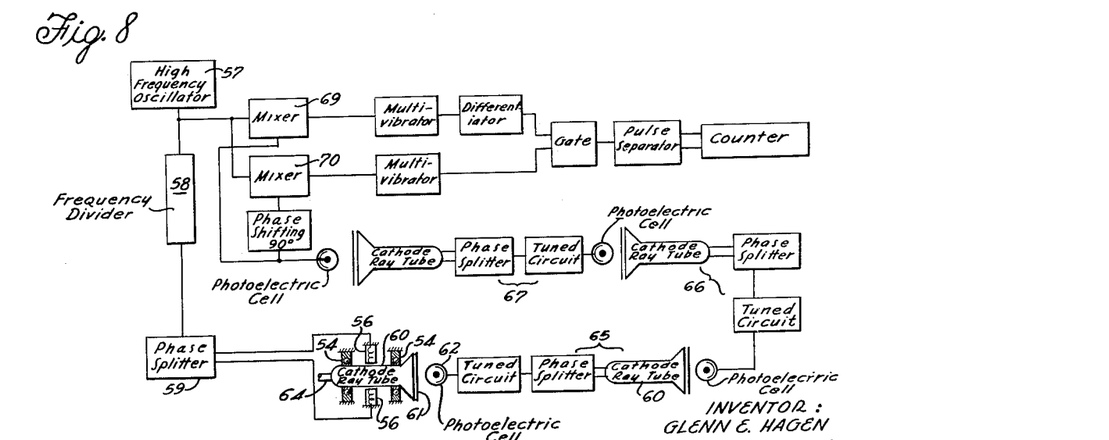
Figure 8 is a schematic diagram of a circuit utilizing a modification of the present invention.

It is noted that the embodiment of the invention shown in Figure 1 takes the pulse output from the two pickup devices 13 and 14, individually multiplies them, and then compares the two frequencies. Another embodiment of the invention for measuring an angle is illustrated in Figure 8. Here the output from a high frequency oscillator 57 is applied to a suitable frequency dividing circuit 58 whereby the high frequency is precisely reduced. The output of the frequency dividing circuit 58 is then applied to a phase splitting circuit 59 and thence to the deflecting coils 56 of a cathode ray tube 60 to cause a circular trace on its screen as previously described in the embodiment of Figure 1. A mask 61, similar to the one in Figure 2 is, in this case, attached to the screen of the cathode ray tube 60.

In accordance with this embodiment of the invention, it is noted that deflection coils 56 of the cathode ray tube are stationarily fixed; and the cathode ray tube 60 itself is rotatably mounted in bearings 54 and attached to a shaft 64 positioned coaxial with the axis of the cathode ray tube screen. It is the angular rotation of shaft 64 that is desired to be accurately measured by this modified embodiment of the invention. As the cathode ray tube is rotated, the relative circular velocity of the spot with respect to the screen and mask 61 of the cathode ray tube 60 is changed. Thus the rate of generation of output pulses from the photocell 62, which is caused by the plurality of windows in the mask 61, is changed in accordance with the angular movement of shaft 64.

The output from the photoelectric cell 62 is then applied to three successive stages of cathode ray tube frequency multiplying circuits 65, 66 and 67 similar to the ones used in the embodiment of Figure 1. It should be noted that the frequency multiplication of these latter circuits is just equal to the frequency division obtained in frequency divider 58.

The output from the frequency multiplying circuit 67 is then compared with the output from the high frequency oscillator 57 in mixing stages 69 and 70 in a manner as previously described.

The remaining part of the circuit of the modified embodiment for making this comparison is exactly identical with that of Figure 1 and will not be here described.

When the shaft 64 is fixed, no output is obtained from the mixing stages 69 and 70. By rotationally displacing the cathode ray tube 60 with respect to its deflecting coils 56, a difference frequency will be obtained at the output of mixing stages 69 and 70 while the rotation is taking place. It is this arc of rotation between the cathode-ray tube and the deflecting coils 56 that is the angle to be measured.

This latter system is similar to the one used in the embodiment of Figure 1 in that a high harmonic interpolation scheme is used, the difference being that the embodiment of Figure 1 starts with a low frequency and multiplies it in both channels before comparison is made, while the embodiment of Figure 8 starts with a high frequency, reduces the frequency, changes the frequency by angular rotation of part of the equipment, then multiplies the frequency for comparison purposes.

The preferred embodiment of the invention is illustrated in Figure 1, however, since the method of measurement employed therein is not subject in any way to the limitations of a mechanical angle measurement device. The use of a single initiating segment 12 associated with a rotating disc 10 together with the proper positioning of the fixed and moveable pickups will precisely give the desired angular change between the pickups since only a single interval is being interpolated. The masks used to increase the frequency from one revolution on the cathode ray tube screen to many electrical pulses on the photoelectric cell, cannot cause an error in the measurement, due to irregularities in the spacing of the transparent and opaque sectors. Furthermore, the use of cathode ray tube photoelectric cell frequency multiplying circuits removes the possibility of losing certain harmonics as would be the one in most electronic frequency multipliers.

Even with the use of a plurality of initiating segments, like track 12a, associated with the rotating disc 10a as previously described and shown in Figure 4, the accuracy of measurement is very precise. In this latter case, the distance to be measured is, in effect, divided into a number of intervals corresponding to the number of equally spaced initiating segments like the waves of track 12a on disc 10a. Although the accuracy of spacing the wave track 12a on the disc 10 using this method may not be as precise as the final result desired, the use of a rotating disc averages out these errors.

When using the modified embodiment of the invention shown in Figure 8, the measurement desired as previously noted is the arc of angular rotation between the mask 61 of the cathode ray tube and the deflecting coils 56. Thus, it should be pointed out here that for this modified embodiment the windows in the mask 61 must be cut to the accuracy desired in the final result in order to take advantage of the harmonic interpolated accuracy obtained by the remaining circuits of the invention.

Referring next to Figure 9, a schematic diagram, partly detailed, is shown of the binary counter 45. Counter 45 is so designed that it counts up or down dependent on which input line 53 or 54 the positive polarity pulses are being fed into it.

Counter 45 is formed from a plurality of flip-flop stages $2^0, 2^0 \ldots 2^n$ connected in series as will be explained. The flip-flop stages for the purpose of this invention are modified Eccles Jordan circuits, and as shown for stage $2^0$ consist of two triodes $V_1$ and $V_2$ with their plates and grids interconnected by resistors and capacitors as is well known. Each of the grids also is connected through individual resistances to a common point X. Point X is negatively biased by a bias resistor $R_1$.

As is well known, the stable states of the flip-flops are when either tube $V_1$ or $V_2$ is conducting. For the present invention, when the tube $V_1$ conducts the digit "zero" is considered to be in the stage and when tube $V_2$ conducts the digit "one" is considered to be in the stage. A stage is triggered from one state to the other by a positive pulse applied at point X of the flip-flop. In order to visually indicate the reading in the counter, a neon lamp L is connected across the plate load resistor $R_5$ of tube $V_2$ of each flip-flop. This lamp L it lit when the digit "one" is in the stage and is dark when the digit "zero" is in the stage.

Each flip-flop stage $2^0$, $2^1$, etc., has two gates associated with it. An upper gate designated $G_u^0$, $G_u^1$, etc., and a lower gate designated $G_L^0$, $G_L^1$ etc. These gates function as carry gates as will be explained.

Each of these carry gates has two input leads and one output lead.

Each of the upper gates $G_u^0$, $G_u^1$ has its input leads designated 72 and 73 and its output lead designated 74. The input leads 72 and 73, in each upper gate circuit, connect therein to the cathode designated ends of, for example, germanium diodes 75 and 76, respectively. The plate designated ends of these diodes are joined together to connect to the output lead 74 of the upper gate. This junction of the two diodes, 75 and 76, is also connected through a resistor $R_2$ to a source of positive potential B. Similarly each of the lower gates $G_L^0$, $G_L^1$ etc., has input lines 77 and 78, and an output line 79. These input lines are connected in a similar manner to germanium diodes 80, 81. The output from these diodes connecting together to form output line 79 and likewise to positive source B through a resistor $R_3$.

Since the action of all the upper and lower gates are the same, only gate $G_u^0$ will be explained.

Gate $G_u^0$, functions to give a high output voltage on output lead 74 only when input voltages on both input leads 72 and 73 are of a high polarity. If either one or the other, or both of the input leads 72 and 73 has a low voltage thereon, the output voltage on output lead 74 is low. This is accomplished because if the voltage on one or both of the input leads 72 and 73 is low, the resistor $R_2$ draws current, and thus the resultant voltage drop in resistor $R_2$ makes the voltage relatively low in the output lead 74. However, if the voltage on both input leads 72 and 73 is high, neither diode 75 nor 76 will conduct, and there will be no voltage drop across $R_2$ so that output lead 74 will essentially exist at the high voltage of positive source B. Thus, for this latter condition, if the high voltage on input lead 73 is of a relatively short duration such as a positive pulse, the output on lead 74 is a positive pulse.

Each of the upper gates, as shown in detail for stage $2^0$, has its input lead 72 connected to the plate of tube $V_1$ of the associated flip-flop stage; and each of the lower gates has its input line 77 connected to the plate of tube $V_2$ of the associated flip-flop stage. Thus, these gates are controlled by their associated flip-flops in such a manner that when the tube, to whose plate they are connected, is non-conducting, the gates are open for permitting positive pulses on the other inputs 73 or 78 to pass therethrough.

The upper gate $G_u^0$ of the first stage has its other input lead 73 connected to the input add line 53 of the counter 45 and all the other upper gates for the remaining stages have their corresponding input leads 73 connected to the output lead 74 from the upper gate associated with the previous stage.

The lower gates are connected in a similar manner. Gate $G_u^0$ of the first stage has its other input line 78, connected to the input subtract line 54 of the counter 45 and all the other lower gates have their corresponding input lines 78 connected to the output lead 79 from the previous gate.

In order for the counter 45 to be able to count up and down it is necessary that the first stage be able to be triggered by a positive pulse feeding into its flip-flop at point X from either the add line 53 or the subtract line 54.

Similarly each successive flip-flop must be able to be triggered by a positive pulse from either the upper or lower carry gates. Hence, an isolator circuit $I^0$, $I^1$, etc., is provided at the input to each stage for enabling these pulses to be fed into the point X of the stage from one set of gates without disturbing the circuit through the other set of gates.

The circuit of isolator $I^n$ is similar to the circuit of the upper and lower gates $G_u^n$, $G_L^n$ in that it has two input conductors 86 and 87, and one output conductor 88. The input conductors 86 and 87 of the isolator circuit connect the plate designated ends of germanium diodes 89 and 90 to the input add line 53 and the input subtract line 54, respectively, for the first stage of the counter; and to the output from the preceding carry gates $G_u^n$ and $G_L^n$ for the remaining stages of the counter. The cathode designated ends of these diodes in the isolator circuit $I^n$ are joined together to form the output conductor 88 which connects the output of the isolator to point X of the flip-flop through a capacitor 83 for each case. The junction of the two diodes 89 and 90 is connected to ground through a resistor $R_4$. Thus this junction is ordinarily at ground potential, however, any time a positive pulse appears on either one or the other of the input conductors 86 or 87, a current is drawn through resistor $R_4$ to make this junction momentarily positive.

The isolator $I^n$ thus serves to isolate the incoming pulses, on either of the input conductors to the isolator, from being felt on the other input conductor.

Thus in accordance with the present invention, the upper gates $G_u^0$, $G_u^1$, etc., connect the flip-flop stages for additive counting and the lower gates $G_L^0$, $G_L^1$, etc., connect the stages for subtractive counting. This is accomplished because the upper and lower gating arrangement shown causes the binary stages to have a carry pulse when a stage passes from "one" to "zero" for additive counting; and causes the binary stages to have a carry pulse when a stage passes from "zero" to "one" for subtractive counting.

In order to illustrate the operation of binary counter 45, assume for example, that the state of the counter for the first three stages is such that is contains the binary number 110 which corresponds to $(1 \times 2^0 + 1 \times 2^1 + 0 \times 2^2)$ or the decimal number 3. Thus the first and second stages have the digit "one" therein. This is the condition when the tubes $V_2$ in the first and second stages are conducting and the $V_1$ tube is conducting in the remaining stage. Assume now that a positive polarity pulse is fed into add line 53 of the counter. This pulse is simultaneously fed to gate $G_u^0$ on lead 73 and to isolator $I^0$ on conductor 86. Since the upper gates are able to pass a pulse on lead 73 when the input lead 72 connected to the flip-flop stage is positive, i. e., the stage is in a "one" condition, the positive add pulse passes the gates $G_u^1$ and $G_u^2$, and appears on isolators $I^1$ and $I^2$. The add pulse cannot pass gate $G_u^3$, however, because it is controlled by the stage $2^3$ which for the present example is in the "zero" state. Thus, the add pulse triggers stages $2^0$, $2^1$ and $2^2$. Stages $2^0$ and $2^1$ are triggered from a "one" to a "zero" digit state and stage $2^2$ is triggered from a "zero" to a "one" digit state. Thus 001 or the decimal number 4 is now contained in the counter. If another positive pulse were fed into the add line 53 the add pulse would be stopped at gate $G_u^0$ and would only be able to trigger the first stage $2^0$ to thus record 101 or the decimal number 5 in the counter.

If now a pulse were to be fed into the counter on subtract line 54, the pulse would be stopped immediately by gate $G_L^0$ since stage $2^0$ is recording a "one." Thus this subtract pulse would only trigger the first stage to a "zero" condition. The number now recorded in the counter would be again 4 or 001. If another pulse were fed in on the subtract line 54, this pulse would pass gates $G_L^0$ and $G_L^1$, since they are both in the zero state but would not pass $G_L^2$. This pulse would thus be enabled to change the state of the first three stages to record 110, or decimal number 3, in the counter.

This completes the description of the binary counter 45 which accords a visual indication of the change in angle obtained in accordance with the previously described apparatus. It should be noted that the details of the two-way binary counter as above described, is not a part of the present invention, except in combination therewith, and is to be claimed in a copending application of F. G. Steele, Serial No. 152,041, filed March 27, 1950.

It should be further noted that this invention is not to be limited to the use of the cathode-ray tube, photoelectric cell type of frequency multiplier circuits; but may utilize standard frequency doublers, triplers, etc., in the embodiments of the present invention shown in Figure 1 or Figure 8 to attain precise angle measurement.

The angle measuring device herein disclosed has use in any type of work where a precise measurement of an angle is required, i. e., surveying, astronomy, optics, etc.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is, therefore, claimed in any of its forms or modifications within the legitimate and valid scope of the appended claims.

What is claimed is:

1. In an angle measurement device, a member adapted to be rotated, a signal initiating element rotatable with said member, a first pickup positioned to be energized by said initiating element, a second pickup positioned to be energized by said initiating element, means for rotating said member to create signals in said pickups, wave forming circuit means connected to each of said pickups, frequency multiplying circuits connected to each of said wave forming circuits for obtaining higher harmonics thereof, means for indicating the numerical difference of said harmonic frequencies resulting from relative movement of said pickups wherein one of said pickups is stationary and the other is movable over an angle to be measured.

2. In an angle measurement device, a member adapted to be rotated, a plurality of signal initiating elements rotatable with said member, a first pickup positioned to be energized by said initiating elements, a second pickup positioned to be energized by said initiating elements, means for rotating said member to create wave signals in said pickups, wave forming circuit means connected to each of said pickups, frequency multiplying circuits connected to each of said wave forming circuits for obtaining higher harmonics of said wave signals, means for indicating the numerical difference of said harmonic frequencies resulting from relative movement of said pickups wherein one of said pickups is stationary and the other is movable over the angle to be measured.

3. In an angle measurement device, a member adapted to be rotated, a circular endless closed periodic wave track rotatable with said member, a first pickup positioned to be energized by said track, a second pickup positioned to be energized by said track, means for rotating said member to create output waves in said pickups, frequency multiplying means connected to each of said pickups for obtaining higher harmonics of said output waves, means for indicating the numerical difference of said harmonic frequency resulting from relative movement of said pickups wherein one of said pickups is stationary and the other is movable over an angle to be measured.

4. In an angle measurement device, a member adapted to be rotated, signal initiating element rotatable with said member, a first pickup positioned to be energized by said initiating element, a second pickup positioned to be energized by said initiating element, means for rotating said member to create output signals in said pickups, wave forming circuits connected to each of said pickups, frequency multiplying means connected to each of said wave forming circuits for obtaining higher harmonics thereof, means for indicating the numerical difference of said harmonic frequency resulting from relative movement of said pickups, and means for indicating the direction of relative movement of said pickups, wherein one of said pickups is stationary and the other is movable over an angle to be measured.

5. Apparatus in accordance with claim 4 wherein said frequency multiplying means comprises a 90° phase splitter for said wave from said wave forming circuit, a cathode ray tube having its deflecting elements connected to said split waves, an opaque mask having a plurality of radial windows positioned in front of the screen of said cathode ray tube, a photosensitive element positioned in front of said mask, whereby each circular cycle of the beam of said tube caused by one cycle of said phase split waves is divided into a number of signals corresponding to the plurality of windows in said mask.

6. In an angle measurement device, a member adapted to be rotated, a signal initiating element rotatable with said member, a first pickup positioned to be energized by said initiating element, a second pickup positioned to be energized by said initiating element, means for rotating said member to create output signals in said pickups, wave forming circuits connected to each of said pickups, frequency multiplying means connected to each of said wave forming circuits for obtaining higher harmonics thereof, a mixer for beating said higher harmonics, means for counting the cycles of the beat-frequency resulting from relative movements of said pickups wherein one of said pickups is stationary and the other is movable over the angle to be measured.

7. In an angle measurement device, a member adapted to be rotated, a signal initiating element rotatable with said member, a first pickup positioned to be energized by said initiating element, a second pickup positioned to be energized by said initiating elements, said pickups arranged so that one is stationary and one is movable over an angle to be measured, means for rotating said member to create signals in said pickups, wave forming circuits connected to each of said pickups, frequency multiplying means connected to each of said wave forming circuits for obtaining higher harmonic frequencies thereof, a first mixer for beating said higher harmonic frequencies, a phase shifting circuit for one of said higher harmonic frequencies, a second mixer for beating said phase-shifted harmonic frequency with said other harmonic frequency, said mixers having a beat-frequency output only when the angle of said movable pickup is changed, means for converting each cycle of the beat frequency from one of said mixers into a positive and a negative output pulse, means for gating said output pulses in accordance with the relative phase of the beat-frequency in said other mixer.

8. In an angle measurement device, a member adapted to be rotated, a signal initiating element rotatable with said member, a first pickup positioned to be energized by said initiating element, a second pickup positioned to be energized by said initiating elements, said pickups arranged so that one is stationary and one is movable over an angle to be measured, means for rotating said member to create signals in said pickups, wave forming circuits connected to each of said pickups, frequency multiplying means connected to each of said wave forming circuits for obtaining higher harmonic frequencies thereof, a first mixer for beating said higher harmonic frequencies, a phase shifting circuit and a second mixer in parallel with said first mixer, said phase shifting circuit for one of said harmonic frequencies, said second mixer for beating said phase-shifted harmonic frequency with said other harmonic frequency, said mixers having a beat-frequency output only when the angle of said movable pickup is changed, means for converting each cycle of the beat frequency from one of said mixers into a positive and a negative output pulse, means for gating said output pulses in accordance with the relative phase of the beat-frequency in said other mixer, and a two-way counter for counting in accordance with the polarity of said output pulses.

9. In an angle measurement device, a member adapted to be rotated, a signal initiating element rotatable with said member, a first pickup positioned to be energized by said initiating element, a second pickup positioned to be energized by said initiating element, said pickups arranged so that one is stationary and one is movable over the angle to be measured, means for rotating said member to create signals in said pickups, wave forming circuit means connected to each of said pickups, frequency multiplying circuits connected to each of said wave forming circuits for obtaining higher harmonic frequencies thereof, a first mixer for beating together said harmonic frequencies, a phase shifting circuit and a second mixer in parallel with said first mixer, said phase shifting circuit for one of said harmonic frequencies, said second mixer for beating said phase-shifted harmonic frequency with said other harmonic frequency, said mixers having a beat-frequency output only when the angle of said movable pickup is changed, a first multivibrator triggered by the difference beat-frequency from one of said mixers, a gate controlled by said first multivibrator, a second multivibrator triggered by the difference beat-frequency from the other of said mixers, a circuit for differentiating the output from said second multivibrator to form positive and negative pulses, said gate passing either polarity pulses in accordance with the action of said first multivibrator, a pulse separator receiving said positive and negative polarity pulses and feeding them out as single polarity pulses on opposite output lines, a two-way counter for counting up and down in accordance with the pulses on said latter output lines.

10. In an angle measurement device, a member adapted to be rotated, a signal initiating element rotatable with said member, a first pickup positioned to be energized by said initiating element, a second pickup positioned to be energized by said initiating element, means for rotating said member to create signals in said pickups, wave forming circuits connected to each of said pickups, a plurality of frequency multiplying trains connected to each of said wave forming circuits for obtaining higher harmonics thereof, a mixer for beating said higher harmonics, means for counting the cycles of the beat-frequencies resulting from relative movement of said pickups wherein one of said pickups is stationary and the other is movable over the angle to be measured.

11. In an angle measurement device, a member adapted to be rotated, a signal initiating element rotatable with said member, a first pickup positioned to be energized by said initiating element, a second pickup positioned to be energized by said initiating element, means for rotating said member at a constant speed to create signals in said pickups, wave forming circuits connected to each of said pickups, a plurality of frequency multiplying trains connected to each of said wave forming circuits for obtaining higher harmonics thereof, each of said frequency multiplying trains comprising a tuning circuit, a 90° phase splitter for said waves from said tuning circuit, a cathode ray tube having its deflecting elements energized by said split waves, an opaque mask having a plurality of radial windows positioned in front of the screen of said cathode ray tube, and a photoelectric element positioned in front of said mask, whereby each circular cycle of the beam of said tube caused by said split waves is divided into a number of signals corresponding to the plurality of windows in said mask, a mixer for beating said higher harmonics, means for counting the cycles of the beat-frequencies resulting from relative movement of said pickups wherein one of said pickups is stationary and the other is movable over the angle to be measured.

12. In an angle measurement device, a member adapted to be rotated, a signal initiating element rotatable with said member, a first pickup positioned to be entergized by said initiating element, a second pickup positioned to be energized by said initiating element, said pickups arranged so that one is stationary and one is movable over the angle to be measured, means for rotating said member to create signals in said pickups, wave forming circuit means connected to each of said pickups, frequency multiplying circuits connected to each of said wave forming circuits for obtaining higher harmonic frequencies thereof, a first mixer for beating together said harmonic frequencies associated with said pickups, a phase shifting circuit and a second mixer in parallel with said first mixer, said phase shifting circuit for said harmonic frequency associated with said movable pickup, said second mixer for said phase shifted harmonic frequency and said frequency from said stationary pickup, a first multivibrator triggered by the difference beat-frequency from said first mixer, a circuit for differentiating the output from said first multivibrator to form positive and negative pulses, a second multivibrator triggered by the difference beat-frequency from said second mixer, a gate controlled by said second multivibrator, said gate passing either polarity pulses from said differentiating circuit in accordance with the action of said second multivibrator, a pulse separator receiving said positive and negative polarity pulses and feeding them out as positive polarity pulses on opposite output lines, a two-way binary counter for counting up and down in accordance with the pulses on said latter output lines.

13. In an angle measurement device, a signal initiating element adapted to be rotated in a circular path, a first means electrically cooperating with said signal initiating element, a second means electrically cooperating with said signal initiating element, said first means movable about an angle to be measured and said second means stationary, wave forming circuit means connected to said first and second means, a first mixer, a phase shifting circuit and a second mixer in parallel with said first mixer, a first frequency changing circuit having the low frequency end thereof connected to one of said wave forming circuit means and the high frequency end thereof connected in parallel to said first and second mixers, a second frequency changing circuit having the low frequency end thereof connected to said other wave forming circuit means and the high frequency end thereof connected in parallel to said first mixer and through said phase shifting circuit to said second mixer, said mixers having a difference beat-frequency output only when the angle of said first means is changed, means for converting each cycle of the beat-frequency from said first mixer into a positive and a negative output pulse, means for gating said output pulses in accordance with the phase relation of the difference beat-frequency of said second mixer with the difference beat-frequency of said first mixer, and means for recording said output pulses.

14. An angle measurement device comprising a member rotatable over an angle to be measured, means for rotating a signal producing element at a substantially constant speed over a circular path, a pickup for creating a signal at a first predetermined frequency from rotation of said signal element, means for multiplying said first predetermined frequency to a higher second predetermined frequency, means for creating relative movement between said pickup and said signal producing element over an arc of said circular path in accordance with rotation of said member, means responsive to the change in said higher second predetermined frequency due to relative motion of said pickup over said arc for an output signal of a frequency equal to said change, and means for counting said output signal frequency as a measure of the angle of rotation of said member.

References Cited in the file of this patent

UNITED STATES PATENTS

| Number | Name | Date |
| --- | --- | --- |
| 1,849,870 | Fitzgerald | Mar. 15, 1932 |
| 1,929,067 | Hund | Oct. 3, 1933 |
| 2,086,904 | Evans | July 13, 1937 |
| 2,089,441 | Smith | Aug. 10, 1937 |
| 2,110,746 | Tolson | Mar. 8, 1938 |
| 2,403,889 | Di Toro | July 9, 1946 |
| 2,407,320 | Miller | Sept. 10, 1946 |
| 2,424,959 | Alford | Aug. 5, 1947 |
| 2,431,591 | Snyder | Nov. 25, 1947 |
| 2,433,403 | Skellett | Dec. 30, 1947 |
| 2,484,218 | Giffen | Oct. 11, 1949 |
| 2,485,245 | Schoenbaum | Oct. 18, 1949 |
| 2,537,427 | Seid | Jan. 9, 1951 |
| 2,575,342 | Gridley | Nov. 20, 1951 |
| 2,614,221 | Moll | Oct. 14, 1952 |